Figure 1:
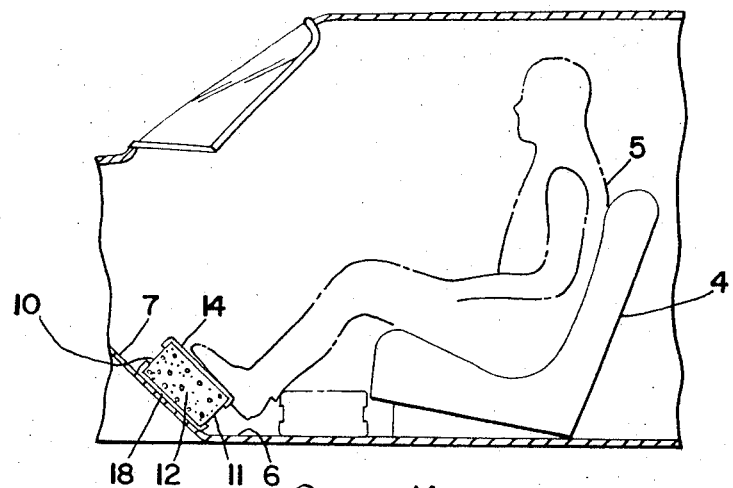

United States Patent [19]

Lichtig

[11] 3,860,284

[45] Jan. 14, 1975

[54] SAFETY DEVICE FOR AUTOMOBILES

[76] Inventor: Sanford Lichtig, 20600 Fairmount Blvd., Shaker Heights, Ohio 44118

[22] Filed: Mar. 2, 1973

[21] Appl. No.: 337,632

[52] U.S. Cl.................... 296/75, 180/90.6, 297/439
[51] Int. Cl............................................... B60n 3/06
[58] Field of Search.................. 280/150 B; 296/75; 297/439; 180/90.6

[56] References Cited
UNITED STATES PATENTS

| | | | |
|---|---|---|---|
| 2,748,838 | 6/1956 | Scholl | 297/439 |
| 2,976,914 | 3/1961 | Miller | 297/425 |
| 3,047,088 | 7/1962 | Murrell | 180/90.6 |
| 3,284,817 | 11/1966 | Landwirth | 297/439 X |

Primary Examiner—Leo Friaglia
Attorney, Agent, or Firm—William Isler

[57] ABSTRACT

A safety device for automobiles is disclosed comprising a block of compressible material, which is positioned against the upwardly inclined portion of the floorboard, and against which the feet of a passenger in the front seat of the car may be pushed to compress the block and cushion the impact of his legs when the car comes to a stop or is about to stop. The device is provided with means for frictionally engaging the carpeting or other floor covering of the car, to assist in preventing displacement of the device from its normal position. In one form of the device, the aforesaid means comprises strips of corrugated rubber which serve to protect the corners and edges of the device.

2 Claims, 3 Drawing Figures

PATENTED JAN 14 1975 3,860,284

SAFETY DEVICE FOR AUTOMOBILES

This invention relates, as indicated, to safety devices for automobiles.

A passenger in an automobile, who is seated next to the driver, is fortunate if his legs are sufficiently long to enable him to place his feet against the upwardly inclined portion of the floorboard, since this enables his body to partially absorb the impact of a sudden stop of the automobile.

Passengers with shorter legs are not so fortunate, since a sudden stop of the automobile, created either inadvertently or through an accident, can result in the passenger being hurled forwardly off the seat, with possible injury to himself as well as damage to the windshield and other parts of the car. This is particularly true where the passenger is a child, whose feet often dangle, without touching the floor.

Moreover, a passenger sitting next to the driver, and who is accustomed to drive a car himself, has a tendency or makes an effort, when the car is about to come to a stop, to push his feet forwardly, a virtually reflex action simulating "applying the brakes," but if his legs do not reach the upwardly inclined portion of the floorboard, the failure to so "apply the brakes" can render the passenger somewhat nervous or irritable.

The present invention has as its primary object the provision of a safety device which can be positioned against the upwardly inclined portion of the floorboard, and which can be reached by the feet of a passenger having relatively short legs, to cushion the impact of the passenger's legs when the car comes to a stop or is about to stop.

Another object of the invention is to provide a safety device of the character described, which is so constructed as to frictionally engage the carpeting or other floor covering of the car, to an extent sufficient to resist displacement of the device from the position in which it is normally placed.

A further object of the invention is to provide a safety device of the character described, which is of such construction as to enable the passenger to place the heels of his shoes against the device, whereby to resist displacement of his feet from the device.

A still further object of the invention is to provide a safety device of the character described, which is of relatively simple construction, whereby it can be manufactured at low cost and sold at a reasonable price.

Other objects and advantages of my invention will be apparent during the course of the following description.

Figure 2:
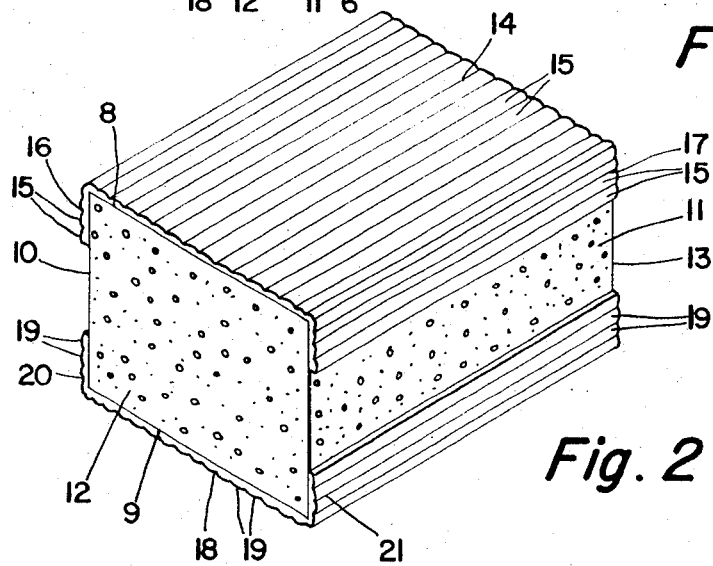
Figure 3:
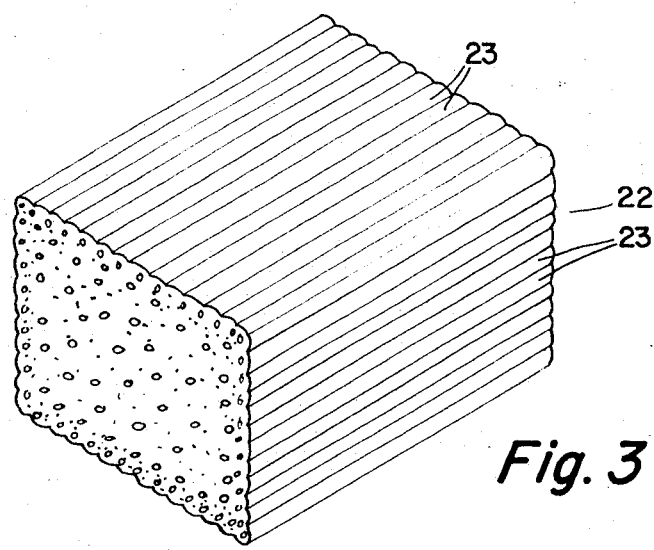

In the accompanying drawings forming a part of this specification, and in which like numerals are employed to designate like parts throughout the same, FIG. 1 is a fragmentary view, showing, in a somewhat diagrammatic manner, the way in which the device is used by a passenger in a car, for the purposes stated above;

FIG. 2 is a perspective view, on an enlarged scale, of the safety device shown in FIG. 1, and FIG. 3 is a view similar to FIG. 2, but of a modified form of the device.

Referring more particularly to FIGS. 1 and 2, reference numeral 4 designates the front seat of an automobile adjacent the driver's seat, and which is occupied by a passenger 5.

The floorboard of the car is indicated by reference numeral 6, and the upwardly inclined or slanted portion of the floorboard, by reference numeral 7.

The safety device, as shown in FIGS. 1 and 2, comprises a rectangular block, preferably made of polyurethane foam, or a similar foam-like resin or plastic, which is easily compressible, but resumes its original shape or form, upon removal of the compressing force.

The block is defined by an upper surface 8, a lower surface 9, a front or forward surface 10, a rear surface 11, and end surfaces 12 and 13.

The surface 8 of the block has adhesively secured thereto a thin lamination or strip 14 of rubber or like material having corrugations 15 on its exterior surface. The strip 14 is of sufficient length to provide downturned flanges 16 and 17, the flange 16 being adhesively secured to the upper portion of the surface 10 of the block, and the flange 17 being adhesively secured to the upper portion of the surface 11 of the block. The corrugations 15, it may be noted, extend longitudinally of the block.

The surface 9 of the block has adhesively secured thereto a thin lamination or strip 18, similar to the strip 14, and having corrugations 19 on its exterior surface. The strip 18 is of sufficient length to provide upturned flanges 20 and 21, the flange 20 being adhesively secured to the lower portion of the surface 10 of the block, and the flange 21 being adhesively secured to the lower portion of the surface 11 of the block. The corrugations 19 extend longitudinally of the block.

The spacing of the flanges 16 and 20 from each other and the spacing of the flanges 17 and 21 from each other enables the block to be more easily compressed than if all of the surfaces 10 and 11 were covered with the rubber strip. The strips 14 and 18 also serve to protect the corners and edge of the block, against being broken off or otherwise damaged.

In use, the safety device is positioned against the inclined portion 7 of the floorboard, in the manner shown in FIG. 1, with its lower edge adjacent the junction of the portions 6 and 7 of the floorboard. This prevents the device from slipping off the portion 7, particularly since such portion of the board is either carpeted or covered with a rubber mat, and the engagement of the corrugations 19 with the carpet or rubber mat provide frictional resistance to movement or displacement of the device.

The passenger places his feet on the device in the manner shown in FIG. 1, with the heels of his shoes engaging the flange 17. This prevents the passenger's feet from slipping off the device.

When the car is about to come to a stop, the forward momentum of the passenger will cause his legs to compress the device, thereby absorbing the impact of the car's stopping, and enabling the passenger to ride in comfort, and without fear of injury to himself. When the car has come to a complete stop, the device will assume its initial, uncompressed condition.

Aside from the value of the device, as a safety device, the passenger can, at all times, use the device as a foot rest, thereby providing resistance of his legs to fatigue.

In FIG. 1, an alternative position of the safety device is indicated by the broken line, this position being on the floorboard 6, immediately forwardly of the seat 4. In this position, the device may be used as a foot rest for the feet of a child, whose legs would otherwise dangle, and have no support.

In FIG. 3, a modification of the invention is shown in which the device comprises a monolithic block 22 of foam rubber or the like, having the portions thereof adjacent the upper and lower surfaces and front and rear surfaces densified or vulcanized to provide corrugations 23, which may be formed in the mold in which the block is cast or molded.

The device of FIG. 3 serves the same purpose as that shown in FIGS. 1 and 2, but eliminates the need for the additional strips 14 and 18 of FIG. 2.

It is to be understood that the forms of my invention, herewith shown and described, are to be taken as preferred examples of the same, and that various changes may be made in the shape, size and arrangement of parts thereof, without departing from the spirit of the invention or the scope of the subjoined claims.

Having thus described my invention, I claim:

1. A safety device of the character described, comprising a rectangular monolithic block of compressible foamed material adapted to be positioned forwardly of the passenger's front seat in an automobile, and to be compressed by the legs of the passenger when the car comes to a stop, whereby to cushion the impact of the stop, said block having densified portions adjacent the top, bottom, front and rear surfaces of the block, said densified portions having corrugations extending longitudinally of the block.

2. In combination with the front passenger seat, horizontal floorboard, and upwardly inclined floorboard of an automobile, a safety device comprising a rectangular monolithic block of compressible foamed material mounted at the base of said upwardly inclined floorboard, and adapted to be compressed by the legs of a passenger occupying said seat, when the car comes to a stop, whereby to cushion the impact of said stop, said block having densified portions adjacent the upper, lower, front and rear surfaces of the block, said densified portions having corruations extending longitudinally of the block.

* * * * *